(12) United States Patent
Swedberg et al.

(10) Patent No.: US 7,201,834 B2
(45) Date of Patent: Apr. 10, 2007

(54) METHODS AND COMPOSITIONS FOR MODIFYING THE SURFACE OF A POLYMERIC SUBSTRATE

(75) Inventors: Sally A. Swedberg, Palo Alto, CA (US); Karla M. Robotti, Mountain View, CA (US); Karin Caldwell, Djursholm (SE)

(73) Assignee: Agilent Technologies, Inc., Santa Clara, CA (US)

( * ) Notice: Subject to any disclaimer, the term of this patent is extended or adjusted under 35 U.S.C. 154(b) by 682 days.

(21) Appl. No.: 10/386,581

(22) Filed: Mar. 11, 2003

(65) Prior Publication Data

US 2003/0230490 A1    Dec. 18, 2003

Related U.S. Application Data

(62) Division of application No. 09/095,493, filed on Jun. 10, 1998, now Pat. No. 6,706,161.

(51) Int. Cl.
*G01N 27/453*    (2006.01)

(52) U.S. Cl. .................. 204/601; 204/616; 204/454

(58) Field of Classification Search ................ 204/455, 204/456, 466, 605, 606, 616
See application file for complete search history.

(56) References Cited

U.S. PATENT DOCUMENTS 5,885,470 A * 3/1999 Parce et al. .................... 216/33

OTHER PUBLICATIONS

NIST Special publication 960-3- The use of Nomenclature in Dispersion Science and Technology, Hackley et al. Aug. 2001.*

"Micro- and Nano-Scale Diagnostic techniques," Ed. K.S. Bruer, Springer Verlag, New York, in press (2003)—3. Electrokinetic Flow Diagnostics, Devasenthipathy & Santiago, p. 124, Figure 3.2.*

Huang et al. ("Capillary zone electrophoresis with fluid-impervious polymer tubing inside a fused-silica capillary," Journal of Chromatography A, 788 (Nov. 14, 1997) 155-164).*

"Surface Modified Polymeric Hollow Fiber Columns for Capillary Electrophoresis," A Dissertation by Peter Liu, published Aug. 1995.*

Holmberg et al. ("Poly(ethylene glycol) grafting as a way to prevent protein adsorption and bacterial adherence," Mittal Festschrift, 1998, pp. 443-460) (note that although published in 1998 (month unknown) the paper was presented at a Congress in Amsterdam held Oct. 16-20, 1995).*

Ng et al. ('Prevention of protein adsorption on surfaces by polyethylene oxide-polypropylene oxide—polyethylene oxide triblock copolymers in capillary electrophoresis, Journal of Chromatography (1994), 659 (2), 427-34).*

Entry for "polyacrylamide" in Hawley's Condensed Chemical Dictionary, 14th Edition, 2002.*

(Continued)

*Primary Examiner*—Alex Noguerola

(57) ABSTRACT

Methods and compositions for modifying the surface of a polymeric substrate are provided. In the subject methods, at least a portion of the surface of the polymeric substrate is contacted with a biofouling resistant surfactant composition. At least a portion of the surfactant molecules of the composition are end modified with a non-reactive, charged end group that is charge stable over a pH range of about 2 to 12. The subject methods and compositions find particular use with electrophoretic devices, such as capillary electrophoretic devices.

15 Claims, 3 Drawing Sheets

OTHER PUBLICATIONS

Pratap Bahadur ('Block copolymers—their microdomain formation (in solid state) and surfactant behavior (in solution), Current Science, vol. 80, No. 8, Apr. 25, 2001).*

Ren et al. ("Hydrophilic Polymer-Modified Polypropylene Hollow Fibers with Controllable Electroosmotic Flow for Capillary Electrophoresis," J. Micro Sep. 8:535-540, 1996).*

Ng et al. ('Prevention of protein adsorption on surfaces by polyethylene oxide-polypropylene oxide—polyethylene oxide triblock copolymers in capillary electrophoresis, Journal of Chromatography (1994), 659(2), 427-34).*

* cited by examiner

METHODS AND COMPOSITIONS FOR MODIFYING THE SURFACE OF A POLYMERIC SUBSTRATE

This is a Divisional of application Ser. No. 09/095,493, filed on Jun. 10, 1998, now U.S. Pat. No. 6,706,161 the entire disclosure of which is incorporated herein by reference.

INTRODUCTION

1. Technical Field

The field of this invention is polymeric surface modification.

2. Background of the Invention

There are many instances in which it is desirable to modify the surface properties of a polymeric substrate. For example, one may wish to modify the surface of a particular polymeric substrate to be more hydrophobic, less hydrophobic, more reactive, less reactive, selectively reactive etc. As such, a number of different technologies have been developed for modifying the surfaces of polymeric substrates.

Polymeric surface modification methods include: physically manipulating the surface, e.g. etching; chemically treating, e.g. contacting the surface with an agent that cleaves the polymeric molecules at the surface to produce functional groups, etc.; and coating the surface with a surface modification layer, e.g. a layer of compounds that mask the surface of the polymeric substrate.

Despite the numerous techniques that have been developed for modifying the surfaces of polymeric substrates, there continues to be interest in the development of new methodologies. Of particular interest is the development of techniques that are suitable for use in the modification of polymeric electrophoretic devices, particularly capillary electrophoretic devices.

RELEVANT LITERATURE

U.S. patents of interest include: U.S. Pat. Nos. 5,728,588; 5,545,302; 5,516,703; 5,464,517; 5,447,617; 5,441,739; 5,441,613; 5,429,728; 5,415,747; 5,378,344; 5,322,608; 5,320,730; 5,221,447; 5,069,766; and 4,680,201.

Other references of interest include: Guzman et al., J. Chromatogr B Biomed. Sci. Appl. (Sep. 12, 1997) 697: 37–66; Yang et al., J. Chromatogr. Sci (August 1997) 35: 358–373; and Holland et al., Pharmaceutical Research (Nov. 4, 1997) 14: 372–387.

SUMMARY OF THE INVENTION

Methods and compositions for modifying the surface of a polymeric substrate are provided. In the subject methods, a biofouling resistant composition comprising non-reactive surfactant molecules end-modified with an end group stably charged over a pH range of about 2 to 12 is contacted with at least a portion of the surface of the polymeric substrate under conditions sufficient for the surfactants to adsorb to the surface of the polymeric substrate in the region of contact. The subject methods and compositions find use in the modification of a variety of polymeric substrates, where the subject invention is particularly suited for use in the modification of polymeric surfaces found in electrophoretic devices.

DESCRIPTION OF THE SPECIFIC EMBODIMENTS

Figure 1:
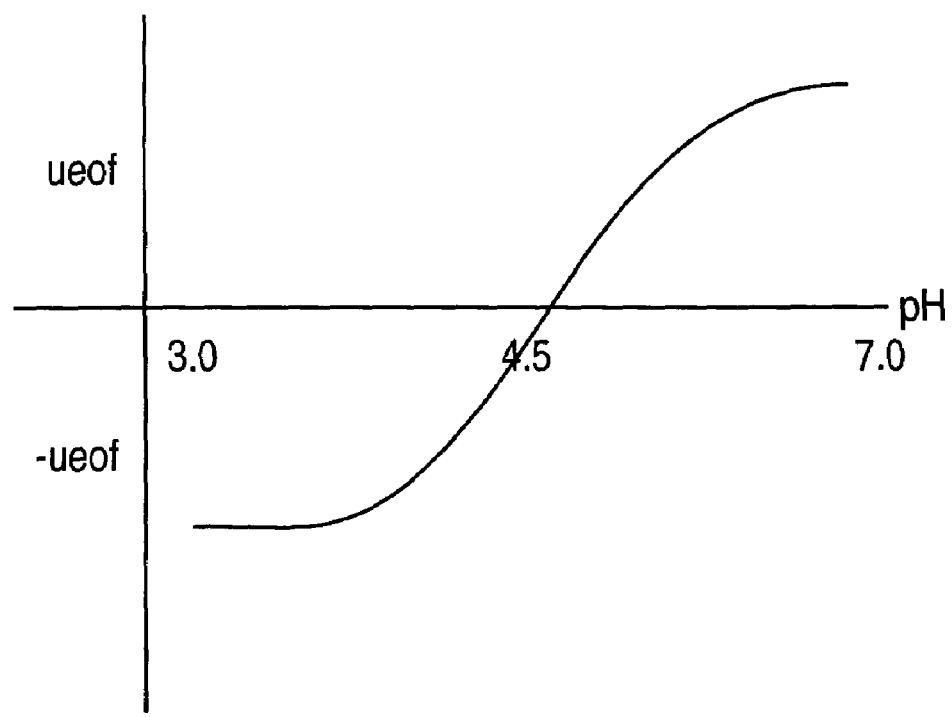
FIG. 1 shows the predictable μeof profile that is achieved by modifying the surface of an electrophoretic component with a biofouling resistant composition that comprises surfactant molecules modified with an end group that carries a stable charge over a defined pH range.

Methods and compositions for use in the modification of the surface of a polymeric substrate are provided. In the subject methods, a biofouling resistant polymeric composition is contacted with at least a portion of the surface of the polymeric substrate under conditions sufficient for adsorption of the surfacant molecules to the surface of the substrate in the region of contact. The biofouling resistant composition is made up, at least in part, of surfactant molecules that are end modified with a non-reactive group that carries a stable charge over a pH range of about 2 to 12. The subject methods and compositions find use in the modification of a variety of polymeric substrates, particularly surfaces of polymeric substrates found in electrophoretic devices.

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

A critical feature of the subject invention is the use of a biofouling resistant surfactant composition to modify at least a portion of the surface of a polymeric substrate. The biofouling resistant surfactant composition may consist entirely of surfactant molecules, or be mixture of surfactant and non-surfactant molecules, where in many embodiments the composition will be made up entirely of surfactant molecules. The surfactant molecules of the biofouling resistant composition are inert with respect to biomolecules such as proteins, carbohydrates, polynucleotides, lipids, etc., where by "inert" is meant that do not readily interact or associate with these biomolecules.

The surfactants of the biofouling resistant composition are polymeric molecules that have a hydrophobic domain sufficient to promote adsorption of the surfactant molecule on the surface of a polymeric substrate. Surfactants of particular interest are polyalkylene oxide surfactants, preferably ones that comprise a hydrophobic domain that is capable of serving as an anchor for the surfactant molecule to the surface of a polymeric substrate. Of particular interest are polyethylene glycol based surfactants having hydrophobic domains, such as the poloxamer surfactants which are triblock copolymers of the formula $(EO)_m$-$(PO)_n$-$(EO)_n$, where m is an integer that ranges from about 35 to 150, usually from about 80 to 130 and n is likewise an integer that ranges from about 25 to 75, usually from about 30 to 60, i.e. polyethylene glycol-polypropylene glycol-polyethylene glycol block copolymers. The molecular weight of the surfactants of the biofouling resistant composition generally ranges from about 2,000 to 25,000 d, usually from about 4,000 to 20,000 d and more usually from about 6,000 to 17,500 d. POLOXAMER surfactants suitable for use in the subject invention are readily available from commercial sources, where specific representative POLAXAMER surfactants include: PLURONICS, e.g. F108, F127, F88, P105, etc., TETRONICS, e.g. 908, (all available from BASF) and the like.

At least a portion of the surfactants of the biofouling resistant composition will be surfactants having an end group that is non-reactive and is capable of carrying a steady charge over a broad pH range. Thus, in order to achieve a series of reagents resulting in a variety of $\zeta$ potential as seen in FIG. 1, unmodified surfactant may be mixed with modified surfactant. Generally, the proportion of the surfactants of the composition that are end-modified will be at least about 5%, usually at least about 10% of the composition, and up and including 100% of the composition. By non-reactive is meant that end group does not readily covalently react with biomolecules, such as those described above.

Charged moieties of the subject surface modification layer are those moieties that are capable of exhibiting a stable charge, either positive or negative, over a desired pH range, where the desired pH range is at least from about 3 to 9, and is preferably from about 2 to 12. Negatively charged groups of interest are those having a pKa of 1–2 or less, where specific negatively charged groups include sulfonic acids. Positively charged groups of interest are those having a pKa of 9–10 or more, where specific positively charged groups include tertiary and quaternary amines.

The subject end-group modified surfactants can be prepared using any convenient methodology. For example, the polyalkylene oxide surfactants can be readily obtained from variety of commercial sources. The surfactants can then be activated to contain a reactive functionality at the terminus which is to be end modified, e.g. the surfactants can be converted to activated esters. The activated surfactant is then combined with the end-group modifier under conditions sufficient for the modifier to couple with the surfactant to produce the end-group modified surfactant. Examples of various means of producing surfactants useful in the subject invention include those describe in the experimental section, infra.

The biofouling resistant composition used to modify the surface of the polymeric substrate is generally prepared by combining the end-group modified surfactants with any non-modified surfactants as well as other desired components, such as solvents, e.g. preferably aqueous based solvents or aqueous solvents comprising mixtures of low molecular weight polar additives, e.g methanol, in low proportions, (e.g. $\leq 30\%$) and the like. Where a combination of modified and non-modified surfactants make up the composition, the ratio of modified to non-modified surfactants will be chosen based on the intended use of the composition, i.e. the properties desired for the modified polymeric surface.

In practicing the subject invention, the surface of the polymeric substrate is modified by contacting at least a portion of the surface of the substrate with the biofouling resisting surfactant composition, where the entire surface may be contacted with the composition or only a portion thereof, as is desired depending on the particular use of the modified substrate. The composition is contacted with the surface in a manner sufficient for the surfactant molecules of the composition to adsorb to the surface of the substrate in the region of contact, where contact may be achieved in any convenient manner, such as by immersion of the substrate in the composition, placing the composition onto the surface of the substrate, flowing the composition over the surface of the substrate, etc., where the particular manner of contact will be chosen based on convenience, particularly in view of the specific configuration of the substrate to modified. Contact between the composition and the substrate is maintained for a sufficient period of time for the surfactant molecules to adsorb to the surface in the region to be modified, generally for a period of time ranging from about 4 to 6 hr, usually from about 1 to 2 hr and more usually from about 20 to 60 min.

Following contact, excess composition may be removed as desired using any convenient methodology, such as flushing, blotting etc., depending on the nature of the substrate and its intended use.

A variety of different polymeric substrates may be modified with subject biofouling resistant compositions, the only limitation being that the surfacant composition must be able to adsorb to the surface of the polymeric material. Polymeric materials of interest that may be modified according to the subject invention include: polyimides, polycarbonates, polyesters, polyamides, polyethers, polyolefins, and mixtures thereof. The polymeric substrate may have a variety of different configurations, where polymeric substrates that may be modified according to the subject methods include: particles, planar objects, columns, capillaries, microchannels, etc.

Of particular interest is the use of the subject compositions to modify the surface of a polymeric substrate that is a component of an electrophoretic device. A variety of different types of electrophoretic devices are currently known and employed by those of skill in the art to achieve the separation of mixtures of components. See e.g. the devices reviewed in the references listed in the Relevant Literature section, supra. The polymeric component of the electrophoretic device whose surface is modified through contact with the biofouling resistant composition of the subject invention is generally the containment means for the electrophoretic medium, i.e. separation medium, that is used in the device and in which the components of the mixture are separated. As such, the polymeric component is typically the surface of one or more walls of the electorphoretic medium container. For example, in two-dimensional planar electrophoretic devices, the polymeric surface that is modified with the biofouling resistant composition may be: (a) the surface of one or more of the polymeric plates containing the separation medium, as describe in Andrews, Electrophoresis, (Clarendon Press, Oxford) (1992) p 17; (b) a planar surface with a plurality of "pegs" arising therefrom, as described in Austin et al., Electrophoresis (1996) 17:1075–1079; and the like. For column electrophoretic devices, the surface that is modified is the inner surface of the column. Similarly, for capillary electrophoresis, the surface that is modified is the inner surface of the capillary. For microchannel devices, in which the electrophoretic medium is housed in a channel etched on the surface of a planar substrate, the surface that is modified is the channel surface such that the modification layer is positioned between the channel and the electrophoretic medium housed therein. Of particular interest in many embodiments are microanalytical electrophoretic devices.

In electrophoretic devices, modification of the surface with the biofouling resistant composition results in the presence of a surface modification layer in the region of composition contact that provides for a surface of shear that is substantially coincident with the Stern plane under electrophoretic conditions, i.e. when an electric field is applied to an electrophoretic medium next to the modified surface. By "surface of shear" is meant the plane or layer in which the fluid in the electrophoretic medium under electrophoretic conditions is stationary and yet immediately next to the fluid layer that is moving, i.e. the fluid plane that does not move despite the application of an electric field to the contents of the electrophoretic medium. By "Stern plane" is meant that region of the electrophoretic medium characterized by the presence of two electrically charged layers of electrolyte ions. For example, in the presence of a negatively charged surface, a positively charged layer of ions will form when the surface is contacted with an aqueous medium, where the resultant electrolyte double layer is known as the Stern plane. By substantially coincident is meant that the surface of shear lies, at most, just above the stern plane away from the surface of the polymeric substrate housing the electrophoretic medium, where the distance under typical conditions (e.g. 5 mM to 100 mM electrolyte concentration) is on the order of 300 Å to 30 Å.

In electrophoretic devices, as well as other types of polymeric substrates suitable for modification by the present invention, the surface modification layer renders the polymeric surface in the location in which it is present resistant to the adsorption of biomolecules, e.g. proteins, polysaccharides, nucleic acids, lipids and the like. By "resistant" is meant that the amount of biomolecule adsorption in the surface modification layer is reduced by at least about 50%, usually by at least about 70% and more usually by at least about 80% as compared to a control (where % is in terms of molecular number). Of particular interest are surface modification layers that render the polymeric surface resistant to protein adsorption.

Of particular interest is the use of the subject methods and compositions to modify the surface of an electrophoretic device in which the electrophoretic medium is housed in a container of capillary dimensions, e.g. a microchannel on a planar substrate or a capillary. By capillary dimensions is meant a container in which any cross-sectional dimension from one side to another, e.g. diameter, widest point between two walls of a channel, etc., does not exceed about 250 µm. A variety of such devices are known to the those of skill in the art. Capillary electrophoretic devices suitable for modification by the subject invention include those described in: U.S. Pat. Nos. 5,750,015; 5,741,411; 5,695,626; 5,667,657; 5,645,702; 5,622,871; 5,616,228; 5,582,705; 5,571,398; 5,543,618; 5,505,832; RE35,102, the disclosures of which are herein incorporated by reference. Microchannel electrophoretic devices suitable for modification by the subject invention include those described in: U.S. Pat. Nos. 5,681,484; 5,662,787; 5,661,028; 5,632,876; 5,599,432; 5,585,069; 5,540,826; 5,458,761, the disclosures of which are herein incorporated by reference.

The particular nature of the biofouling resistant composition that is used to modify he surface of the electrophoretic device will depend, at least in part, on the desired EOF characteristics of the device following modification. The portion of the surfactants of the biofouling resistant compositions that are end modified can be tailored depending on the particular conditions desired during electrophoretic use of the surface modified capillary, and will therefore vary accordingly. For example, the direction and magnitude of EOF can be controlled by selecting the appropriate amount and type of end modified EOF to include. Thus, where one desires a positive electroosmotic mobility ($\mu$eof), the biofouling resistant composition that is used to modify the surface of the polymeric electrophoretic component will comprise surfactant molecules having end groups that carry a stable negative charge, e.g. sulfonic acid, where the proportion of the surfactant molecules of the biofouling resistant composition that carry the charged end-group will generally be at least about 25%, and can be 50%, 75%, or higher including 100%. Where one desires a negative $\mu$eof, the biofouling resistant composition that is used to modify the surface of the polymeric electrophoretic component will comprise surfactant molecules having end groups that carry a stable positive charge, e.g. tertiary or quaternary amine, where the proportion of the surfactant molecules of the biofouling resistant composition that carry the charged end-group will generally be at least about 25%, and can be 50%, 75%, or higher including 100%. The subject methods and compositions thus provide a means of specifically tuning or controlling the EOF of the device to meet the needs, e.g. resolution requirements, of a particular electrophoretic run.

Electrophoretic polymeric components modified according to the subject invention find use in a variety of different electrophoretic applications in which a voltage gradient is applied to the contents of the electrophoretic medium of the device in a manner sufficient to differentially move and therefore separate the individual constituent analytes of a sample through the medium. Electrophoretic devices and methods for their use in which the polymeric components modified according to the subject invention may be employed include: U.S. Pat. Nos. 5,695,626; 5,674,743; 5,667,657; 5,622,871; 5,616,228; 5,582,705; 5,571,398; 5,543,618; 5,505,832; 5,498,324; 5,484,571; 5,480,525; RE35,102; 5,449,064; 5,429,734; 5,332,480; 5,326,445; 5,324,401; 5,318,686; 5,298,134; 5,232,565; 5,228,969; 5,217,590; 5,143,850; 5,141,621; 5,131,997; 5,124,020; 5,102,517; 5,073,239; 5,066,382; 5,053,115; 5,047,134; 4,985,129; 4,908,116 and 4,906,344; the disclosure of which are herein incorporated by reference. Other systems and methods of using the electrophoretic devices are described in the references appearing in the relevant literature section, supra. Generally, in electrophoretic applications, the sample is introduced into the electrophoretic medium and an electric potential is applied to the contents of the medium, resulting in differential movement of the sample constituents through the medium.

Electrophoretic devices modified according to the subject invention find use in the electrophoretic separation of a variety of different analytes, where such analytes include: amino acids, chiral drugs, vitamins, pesticides, inorganic ions, organic acids, dyes, surfactants, peptides and proteins, carbohydrates, oligonucleotides and DNA restriction fragments, and even whole cells and virus particles. Of particular interest is the use of surface modified devices according to the subject invention in methods of separating proteinaceous analytes, e.g. proteins, peptides and the like.

Where the subject methods and compositions are used to modify the surface of an electrophoretic component, the result is a surface that gives rise to a predictable $\mu$eof profile. For example, where the biofouling resistant composition described above is employed, the resultant $\mu$eof profile is constant over a defined pH range, e.g. from 3 to 9 or preferably from 2 to 12. See FIG. 1.

Figure 2:
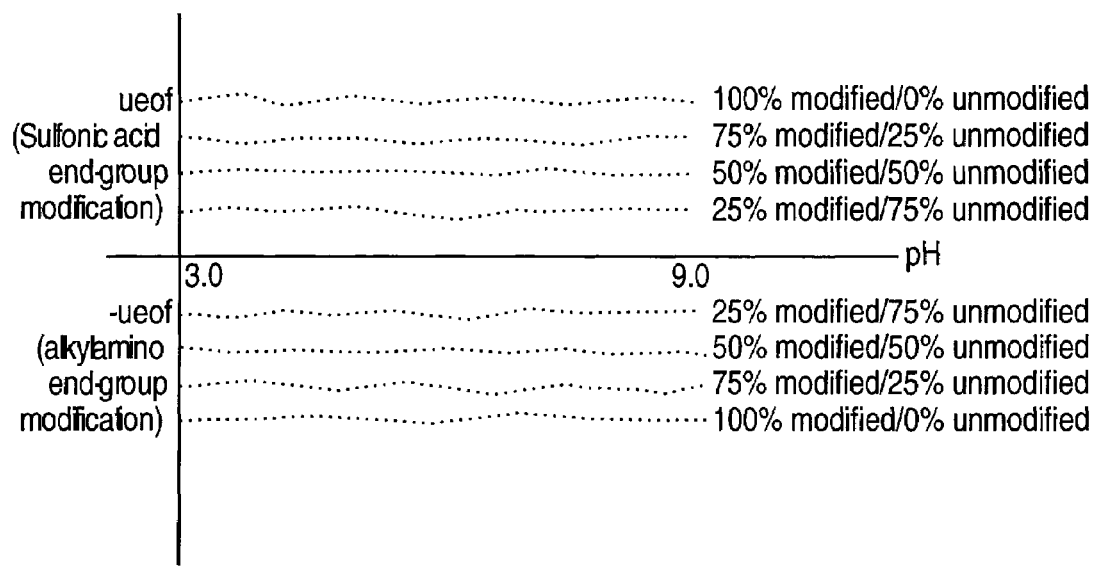
FIG. 2 shows the predictable μeof profile that is achieved by modifying the surface of an electrophoretic component with a biofouling resistant composition that comprises surfactant molecules modified with an end group that is an amphotere.

Predictable µeof profiles can also be achieved in which the profile varies over a defined pH range. This type of predictable profile can be achieved using biofouling resistant compositions in which the surfactants that are modified with a non-reactive end group are modified with an amphoteric instead of a group capable of carrying a stable charge over a defined pH range, such as the compositions described above. In the biofouling resistant compositions of this embodiment of the invention, a variety of amphoteric moieties may be employed. Amphoteric moieties that may be employed are those moieties that are capable of simultaneously containing weakly ionizable acidic and basic groups, such as peptides, proteins, peptoids, synthetic ampholytes, and the like. FIG. 2 provides a representation of the predictable µeof profile that may be achieved using a biofouling resistant composition with amphoteric modified surfactants.

Also provided are kits for modifying polymeric surfaces according to the present invention. The subject kits comprise at least one biofouling resistant surfactant composition, or the components thereof, in separate containers. For example, a premade biofouling resistant composition could be present in the kit in a suitable container or the components of the composition could be present in different containers, i.e. the modified and non modified surfactant molecules of the composition. Where the components are present in different containers, the user has the option of preparing a custom composition and to achieve different surface modifications from the same kit. The kits of the subject invention will also typically include instructions for modifying the surface of a substrate according to the subject invention, where these instructions may be present on one or more of the packaging, labeling or a package insert.

Of particular interest are kits for modifying the surface of polymeric substrates according to the subject invention. Such kits may comprise, in addition to the components described above, one or more of: (a) the electrophoretic polymeric component(s) to be modified, e.g. capillaries, microchannel devices, etc.; (b) the electrophoretic separation medium; (c) the labels for use in electrophoresis; and (d) other reagents for practicing electrophoresis.

The following examples are offered by way of illustration and not by way of limitation.

EXPERIMENTAL

I. Synthesis of Modified Surfactants

A. Materials:

The Pluronic surfacant, F108, was donated by BASF Co. and has a molecular weight of 14,600 that corresponds to 129 monomer units in each PEO block. The 4-nitrophenyl chloroformate and taurine were bought from Aldrich while the 2-(aminoethyl)-trimethylammonium chloride-HCl salt was obtained from Sigma Chemicals. Dialysis membranes (Spect/Por 7) with a 2000 Da cutoff were purchased from Fisher Scientific Co. Elemental analyses were performed by Galbraith Laboratories (Knoxville, Tenn.).

B. Pluronic F108-Active Ester Intermediate.

Pluronic-F108 (4 g, 0.274 mmol or 0.548 mmol of available OH's) was dissolved in 12 ml of benzene. This solution was slowly pipetted into a solution of 4-nitrophenylchloroformate (0.34 g, 1.64 mmol) in 12 ml of benzene. This mixture, a colorless solution, was stirred for 1 hour, then placed on a shaker for 24 hours at room temperature. The product was precipitated with ca. 80 ml of ether (anhyd.), filtered, and re-dissolved in benzene. Precipitation was carried out one more time, then the product was placed into benzene and the solvent removed in vacuo. The colorless oil was re-precipitated with ether to a white solid. The solvent was again removed in vacuo and the remaining solids (ca. 3.5 g) were placed under vacuum overnight. This material is kept under vacuum until use, since it would hydrolyze in moisture.

C. Coupling of Pluronic-Active Ester Intermediate with Various Amines.

1). N,N-Dimethylpropylamine (tertiary amine product). The propylamine (9 g, 11 ml, 44 mmol) was placed into 10 ml of dionized water and the pH adjusted to 8.2 with concentrated HCl. This basic solution was added to a solution of 1 g of the 4-nitrophenyl active ester in 10 ml of water. The addition created a yellow solution as 4-nitrophenol was released into the reaction. The reaction was left on a shaker for 3 days. The solution was then dialyzed against dionized water for 3–4 days, changing the water at least 2 times a day. (Note: the amine causes the dialysis bags to swell slightly, so double knot). When the solution in the bags was colorless, it was lyophilized to recover product (ca. 0.96 g).

2). Taurine (2-aminoethansulfonic acid). [Aqueous Reaction Conditions]. Taurine (6.8 g, 54 mmol) was placed into 14 ml of dionized water. The pH was adjusted to ca. 9.6 with 50% NaOH solution. This solution was added to a mixture of 1 g of Pluronic active ester in 10 ml of water. The reaction turned yellow and was placed on a shaker at room temperature for 3 days. The product was obtained after extensive (2–3 days) dialysis against water and lyophilization. Anal. Calcd. for diadduct: C, 55.5; H, 9.26; N, 0.19; S, 0.43.

[Non-aqueous Reaction Conditions]. Dissolved 1.5 g of Pluronic active ester in 40 ml of benzene. Then added 10.2 g (81 mmol) of taurine, followed by 28 ml (162 mmol, 2 eq.) of N,N-diisopropylethylamine. The reaction solution is slightly yellow. Stirred gently for 2 days, then added ca. 30 ml of DMF to help dissolve the taurine. On the 3$^{rd}$ day, only enough water was added to solubilize the remaining taurine. Continued stirring for 2 days. Product was retrieved after dialysis against deionized water, then lyophilization. Anal. Calcd. for diadduct: C, 55.5; H, 9.26; N, 019; S, 0.43. Found: C, 54.86; H, 9.3; N, <0.5; S, 0.48.

3). 2-(Aminoethyl) trimethylammonium chloride. Hcl (quarnary amine product). [Aqueous Reaction Conditions]. Placed 5 g (28.6 mmol) of 2-(aminoethyl)-trimethylammonium chloride-HCl salt in 10 ml of water. Adjusted the pH of ther solution to 8.8 with 50% NaOH solution. Added the amine solution of 1 g of the Pluronic active ester in 10 ml of water. The yellow reaction solution was left on a shaker at room temperature overnight. The product was obtained after several days of dialysis, then lyophilization. Anal Calcd. for diadduct: C, 56.1; H, 9.38; N, 0.38. Found: C, 55.88; H, 9.48; N, 0.29.

[Non-aqueous reaction conditions]. Dissloved 1 g of Pluronic active ester into 40 ml of benzene. Added 5 g (28.6 mmol) of 2-(aminoethyl) trimethylammonium chloride-HCl salt and 2 eq. (7.8 ml) of triethylamine. After 2 days, added 20 ml DMF to aid solubilization of salt. On the third day, added ca. 3–5 ml of water to completely solubilize the reaction. The benzene was evaporated in vacuo and the remaining reaction solution was dialized against water, then lyophilized. Anal. Calcd. for diadduct: C, 56.1; H, 9.38; N, 0.38; found: C, 55.83; H, 9.38; N, 0.35.

II. Modification of a Capillary

Commercially available hydrophobic capillaries (such as a uSIL-FC capillary (J&W Scientific, Folsom, Calif.)) were cut to appropriate size and placed into a capillary electrophoresis instrument (HP-CE; Hewlett-Packard HP 3DCE). These capillaries were coated by flushing the capillary with a dilute aqueous solution (e.g. 1% or as little as 0.001%) of a modified Pluronic reagent (e.g., F108-Taurine derivative described above) for 45 minutes at 25° C. This was followed by flushing the capillary with fresh buffer solution at the desired pH for 40 minutes to remove any extraneous reagent.

III. Use of Modified Capillary

Figure 3:
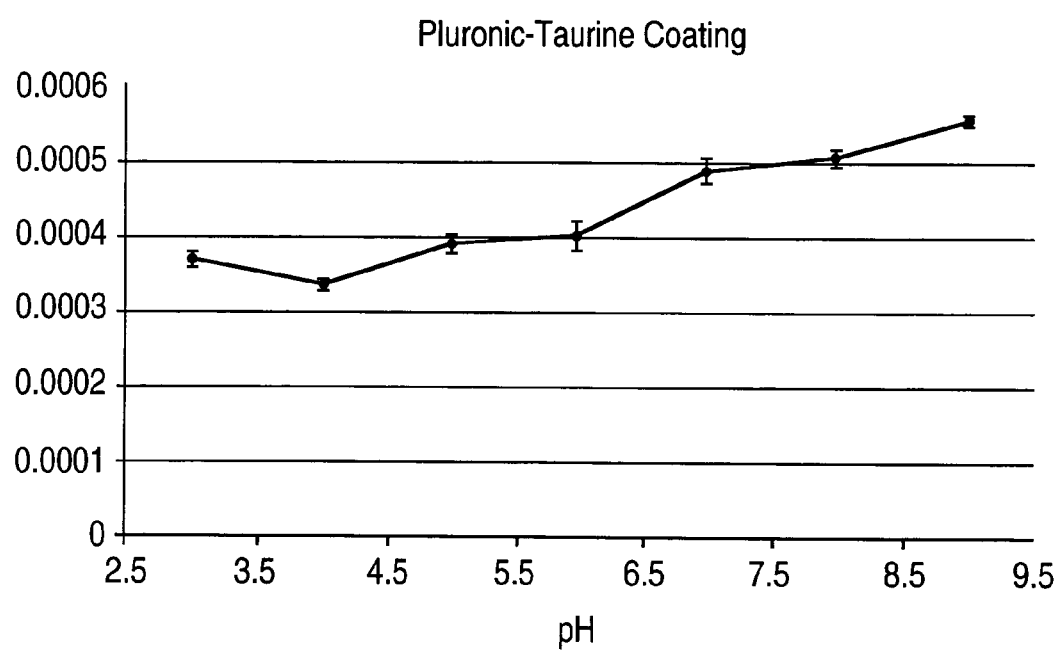
FIG. 3 shows the mobility of an EOF marker v. pH in a modified capillary according to the subject invention.

A modified coated capillary of 33.5 cm length (25 cm to the window) and 50 μm i.d. was placed in a capillary electrophoresis instrument. A buffer of desired pH was flushed through the capillary for 5 to 40 minutes, then an EOF marker such as DMSO was injected in a 100 mbar-sec plug. Voltage was set at +10.1 kV (equivalent to a field of 301 volts/cm) when using the F108-taurine modified Pluronic coating. Mobility of the EOF marker vs. pH is plotted in FIG. 3.

It is evident from the above discussion and results that improved compositions and methods for modifying the surface properties of a polymeric substrate are provided. Surfaces are easily modified by merely contacting the surface with the subject biofouling resistant compositions so that the surfactants of the composition adsorb to the surface. The subject methods and compositions provide for particular improvements in the area of electrophoresis, where the subject methods and compositions provide for simple and convenient ways to predictably control the μeof in electrophoretic devices and thereby achieve better results.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the scope of the appended claims.

What is claimed is:

1. An electrophoretic device having a polymeric container capable of holding an electrophoretic separation medium, where on at least a portion of a surface of said polymeric container a surface modification layer is present that is resistant to biomolecule adsorption and provides a shear layer that is substantially coincident with the Stem layer under electrophoretic conditions, wherein said surface modification layer comprises a biofouling resistant surfactant composition, at least a portion of surfactant molecules of said composition are modified with an end group, the end group selected from a sulfonic acid, a non-reactive end group that has a stable positive charge over a pH range of about 2 to 12, and an amphoteric end group.

2. The device according to claim 1, wherein the end group is a non-reactive end group that has a stable charge over a pH range of about 2 to 12.

3. The device according to claim 2, wherein said surfactant molecule of said composition are polyalkylene oxides.

4. The device according to claim 3, wherein said surfactant molecule of said composition are polyethylene oxide-polypropylene oxide-polyethylene oxide block copolymers.

5. The device according to claim 2, wherein said stable charge is negative.

6. The device according to claim 5, wherein said end group is sulfonic acid.

7. The device according to claim 2, wherein said stable charge is positive.

8. The device according to claim 7, wherein said end group is a tertiary or quaternary amine.

9. The device according to claim 1, wherein said electrophoretic device is a two dimensional planar electrophoretic device.

10. The device according to claim 1, wherein said electrophoretic device is a column electrophoretic device.

11. The device according to claim 1, wherein said electrophoretic device is a capillary electrophoretic device.

12. The device according to claim 1, wherein said electrophoretic device is a microanalytical electrophoretic device.

13. An electrophoretic device having a polymeric container capable of holding an electrophoretic separation medium, where on at least a portion of a surface of said polymeric container a surface modification layer is present that provides for a predictable μeof profile over a defined pH range, wherein said surface modification layer comprises a biofouling resistant surfactant composition, at least a portion of surfactant molecules of said composition are modified with an end group, the end group selected from a sulfonic acid, a non-reactive end group that has a stable positive charge over a pH range of about 2 to 12, and an amphoteric end group.

14. The electrophoretic device according to claim 13, wherein the end group is an amphoteric end group.

15. In an electrophoretic application, the improvement comprising: performing said application in a device according to claim 1 or claim 13.

* * * * *